(12) United States Patent
Naruse

(10) Patent No.: US 9,541,164 B2
(45) Date of Patent: Jan. 10, 2017

(54) AXIAL CONVERSION GEAR DEVICE

(71) Applicant: NABTESCO CORPORATION, Tokyo (JP)

(72) Inventor: Takashi Naruse, Mie (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 14/697,990

(22) Filed: Apr. 28, 2015

(65) Prior Publication Data

US 2015/0323043 A1  Nov. 12, 2015

(30) Foreign Application Priority Data

May 9, 2014  (JP) .................... 2014-097887

(51) Int. Cl.
*F16H 1/32* (2006.01)
*F16H 37/00* (2006.01)
*F16H 37/04* (2006.01)

(52) U.S. Cl.
CPC ............... *F16H 1/32* (2013.01); *F16H 37/00* (2013.01); *F16H 37/041* (2013.01); *F16H 2001/323* (2013.01)

(58) Field of Classification Search
CPC .............................. F16H 2001/323; F16H 1/32
See application file for complete search history.

(56) References Cited

U.S. PATENT DOCUMENTS

| 7,070,533 | B2 * | 7/2006 | Tsurumi | ................... F16H 1/32 475/162 |
| 7,534,184 | B2 * | 5/2009 | Tsurumi | ................... F16H 1/32 475/162 |
| 2009/0118050 | A1 * | 5/2009 | Takeuchi | ................... F16H 1/32 475/168 |
| 2011/0275469 | A1 | 11/2011 | Miyoshi et al. | |

FOREIGN PATENT DOCUMENTS

| JP | 2010-101366 A | 5/2010 |
| JP | 2010-159851 A | 7/2010 |
| JP | 2011-231931 A | 11/2011 |

* cited by examiner

*Primary Examiner* — Sherry Estremsky
(74) *Attorney, Agent, or Firm* — Pillsbury Winthrop Shaw Pittman LLP

(57) ABSTRACT

An axial conversion gear device includes: a crankshaft having a first eccentric portion and a shaft gear; a first oscillation gear having first external teeth; a transmitting gear having a first gear engaged with the shaft gear and a second gear spaced apart from the first gear in an axial direction of the first gear; an axial conversion unit having an external tooth gear engaged with the second gear and an axial conversion gear converting input torque into torque in an axial direction of the external tooth gear; and an outer cylinder having inner tooth pins engaged with the first external teeth of the first oscillation gear, wherein in the axial direction of the external teeth gear, the axial conversion gear is located between the first gear and the second gear.

6 Claims, 5 Drawing Sheets

AXIAL CONVERSION GEAR DEVICE

TECHNICAL FIELD

The present invention relates to an axial conversion gear device.

BACKGROUND ART

An axial conversion gear device that converts a first direction of input torque into a second direction is known.

FIG. 4 illustrates a gear transfer device described in Japanese Unexamined Patent Publication No. 2010-101366 as an example of an axial conversion gear device. The gear transfer device includes an axial conversion unit 200 and a speed reduction unit 300. The axial conversion unit 200 includes a first bevel gear 210, a second bevel gear 220 engaged with the first bevel gear 210, and an input gear 230 that has a same axis as the second bevel gear 220 and that has an outer diameter smaller than the second bevel gear 220. On the other hand, the speed reduction unit 300 includes a center gear having a first outer gear 310 and a second outer gear 320 having a diameter greater than the first outer gear 310, a crankshaft having an outer gear 330 engaged with the first outer gear 310 and an eccentric portion 340, and an external tooth gear 350 that oscillates and rotates as the eccentric portion 340 oscillates and rotates. The second outer gear 320 of the center gear is engaged with the input gear 230 of the axial conversion unit 200, and in an axial direction of the input gear 230, the second bevel gear 220 is located farther from the first outer gear 310 than the input gear 230. In the gear transfer device, input torque of a motor is transferred to the second bevel gear 220 through the first bevel gear 210 so as to transfer the input torque to the axial direction of the input gear 230. The torque is transferred from the input gear 230 to the external tooth gear 350 through the center gear and the crankshaft. As a result, the external tooth gear 350 oscillates and rotates.

FIG. 5 illustrates a gear transfer device described in Japanese Unexamined Patent Publication No. 2010-159851. In this gear transfer device, an input gear 230 is located closer to a bottom surface B1 side than a second bevel gear 220 in an axial direction of the input gear 230. The input gear 230 and an outer gear 330 of a crankshaft are disposed nearly on a same plane.

In a gear transfer device described in Japanese Unexamined Patent Publication No. 2010-101366, since the second bevel gear 220 and the input gear 230 have the same axis, the gear transfer device can be prevented from radially becoming large. However, in this gear transfer device, the second bevel gear 220 is located farther from the first outer gear 310 than the input gear 230 in the axial direction of the input gear 230. Thus, the first bevel gear 210 engaged with the second bevel gear 220 and the motor that outputs torque to the first bevel gear 210 are located far from the first outer gear 310 in the axial direction of the input gear 230. A bottom surface B1 of the gear transfer device is designed for example based on a height of a side surface of the motor. Thus, if the motor is located far from the first outer gear 310 in the axial direction of the input gear 230, the bottom surface B1 is accordingly located far from the first outer gear 310. As a result, a dead space is formed between the second bevel gear 220 and the bottom surface B1 of the gear transfer device in the axial direction of the input gear 230. Consequently, the gear transfer device is likely to axially become large.

On the other hand, in the gear transfer device described in Japanese Unexamined Patent Publication No, 2010-159851, since the input gear 230 is located axially closer to the bottom surface B1 side than the second bevel gear 220, the gear transfer device can be prevented from axially becoming large. However, in this gear transfer device, since the input gear 230 and the outer gear 330 are located nearly on a same plane, the axes of the second bevel gear 220 and the input gear 230 have to be located apart from the axis of the crankshaft having the outer gear 330 to some extent so as to prevent the input gear 230 and the outer gear 330 from interfering with each other. Thus, it is difficult to radially downsize the gear transfer device.

SUMMARY OF INVENTION

The present invention is made from the foregoing point of view. An object of the present invention is to provide an axial conversion gear device that can be prevented from axially becoming large and that can be radially downsized.

An axial conversion gear device according to the present invention includes: a crankshaft having a shaft main body, an eccentric portion that is eccentric to the shaft main body, and a shaft gear disposed on the shaft main body; an oscillation gear having a plurality of external teeth and oscillating and rotating due to rotation of the eccentric portion; a transmitting gear having a first gear engaged with the shaft gear of the crankshaft and a second gear spaced apart from the first gear in an axial direction of the first gear; an axial conversion unit having an external tooth gear engaged with the second gear and an axial conversion gear converting input torque into torque in an axial direction of the external tooth gear; and an outer cylinder having a plurality of internal teeth engaged with the external teeth of the oscillation gear respectively, wherein in the axial direction of the external tooth gear, the axial conversion gear is located between the first gear and the second gear.

DESCRIPTION OF EMBODIMENTS

An embodiment of the present invention is described hereinafter with reference to the drawings. The following embodiment is merely a concrete example of the present invention and is not intended to limit the technical scope of the present invention.

Moreover, with reference to the accompanying drawings, an embodiment of the present invention will be described. Each figure referred in the following description shows, for convenience of explanation, only simplified principal members of structural members of an axial conversion gear device X1 according to the present embodiment. Thus, the axial conversion gear device X1 according to the present embodiment may include structural members not illustrated in the individual figures referred in the present specification.

Figure 1:
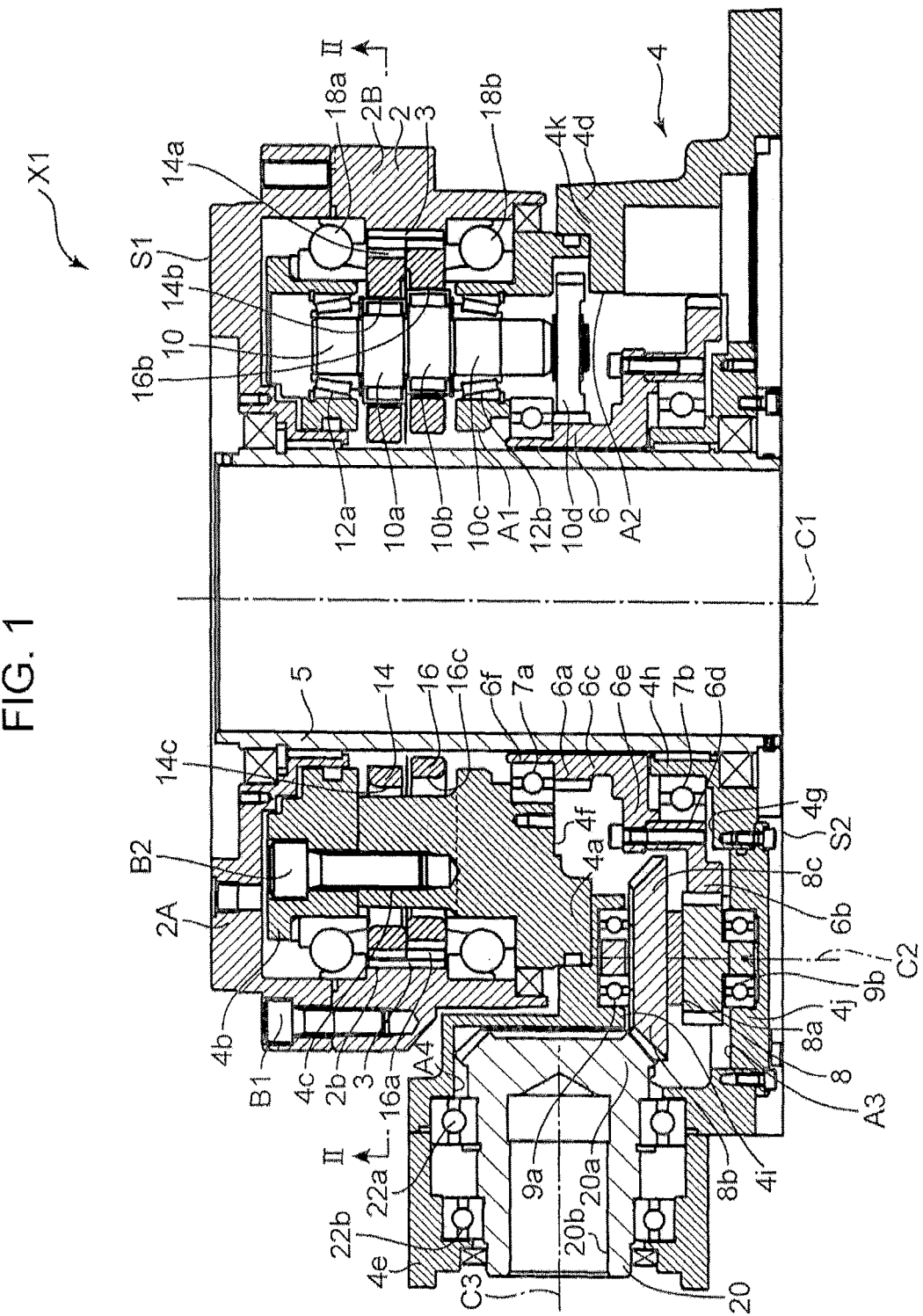
FIG. 1 is a sectional view illustrating an outlined structure of an axial conversion gear device according to an embodiment of the present invention.

The axial conversion gear device X1 according to the present embodiment is a speed reducer that converts torque of one axial direction into torque of another axial direction. In the following description, with reference to FIG. 1 and FIG. 2, a structure of the axial conversion gear device X1 will be described in detail.

The axial conversion gear device X1 mainly includes an outer cylinder 2, a carrier 4, a crankshaft 10, a first oscillation gear 14, a second oscillation gear 16, a cylindrical member 5, a transmitting gear 6, an axial conversion unit 8, and an input shaft 20.

The outer cylinder 2 is a rotation side member of the axial conversion gear device X1 according to the present embodiment. The outer cylinder 2 includes a first member 2A having an axial end surface that composes an upper surface S1 of the axial conversion gear device X1 and a second member 2B located on one side in an axial direction of the first member 2A (on a lower side of the first member 2A illustrated in FIG. 1). The first member 2A has, at a center portion thereof, a through-hole that surrounds a center axis C1. The cylindrical member 5 is inserted into the through-hole. The second member 2B has a cylindrical shape having a cavity connected to the through-hole of the first member 2A. The first member 2A and the second member 2B are secured to each other by a plurality of bolts B1 located equally in a circumferential direction of the outer cylinder 2.

Many pin gloves 2b are formed in an inner circumferential surface of the second member 2B of the outer cylinder 2. The pin gloves 2b extend in the axial direction of the outer cylinder 2 and have a semi-circular cross-sectional shape perpendicular to the axial direction. These pin gloves 2b are equally and circumferentially located in the outer cylinder 2.

The outer cylinder 2 has many inner tooth pins 3. The inner tooth pins 3 are attached to the pin gloves 2b of the second member 2B. Specifically, the inner tooth pins 3 are inserted into the corresponding pin gloves 2b so that the inner tooth pins 3 extend in the axial direction of the outer cylinder 2. As a result, the many inner tooth pins 3 are equally located in the circumferential direction of the outer cylinder 2. The inner tooth pins 3 are engaged with a first outer tooth member 14a of the first oscillation gear 14 and a second outer tooth member 16a of the second oscillation gear 16.

The carrier 4 is a fixed side member of the axial conversion gear device X1 according to the present embodiment. The carrier 4 is located around the center axis C1 of the outer cylinder 2. A part of the carrier 4 is enclosed in the outer cylinder 2. Disposed between the outer cylinder 2 and the carrier 4 enclosed in the outer cylinder 2 are a pair of main bearings 18a and 18b that are spaced apart from each other in the axial direction of the axial conversion gear device X1. The main bearings 18a and 18b allow the carrier 4 and the outer cylinder 2 to relatively rotate.

The carrier 4 includes a pedestal 4a, a plurality of shaft members 4c, and an end plate member 4b. According to the present embodiment, the pedestal 4a and the shaft members 4c are integrally formed. The shaft members 4c and the end plate member 4b are individually formed. The end plate member 4b is secured to the shaft members 4c with a plurality of bolts B2. Alternatively, the pedestal 4a, the shaft members 4c, and the end plate member 4b may be independent members, not integrally formed. In this case, the pedestal 4a, the shaft members 4c, and the end plate member 4b are secured for example with the bolts 132.

The pedestal 4a is a member that functions as a base of the carrier 4. The pedestal 4a faces the end plate member 4b through the oscillation gears 14 and 16 in the axial direction of the axial conversion gear device X1. The pedestal 4a has a main body member 4d and a protrusion member 4e that protrudes from a side surface of the main body member 4d.

The main body member 4d has an axial end surface that composes a bottom surface S2 of the axial conversion gear device X1. The main body member 4d encloses a part of the cylindrical member 5, a part of the crankshaft 10, the transmitting gear 6, and the axial conversion unit 8. Specifically, the main body member 4d has a first space A1, a second space A2, a third space A3, and a crankshaft hole. The first space A1 is a space that pierces the center portion of the main body member 4d in the axial direction of the axial conversion gear device X1. The first space A1 is connected to the through-hole of the first member 2A of the outer cylinder 2. The first space A1 encloses a part of the cylindrical member 5. The second space A2 is a space that circumferentially surrounds the first space A1 at a middle portion in the axial direction of the first space A1. The second space A2 encloses the transmitting gear 6 disposed around the cylindrical member 5. The third space A3 is a space that radially extends from the second space A2 and that is open to the side surface of the main body member 4d. The third space A3 encloses the axial conversion unit 8. The crankshaft hole is formed around the first space A1. The crankshaft hole extends in the axial direction of the axial conversion gear device X1. The crankshaft hole of the main body member 4d encloses a shaft main body 10c and a shaft gear 10d of the crankshaft 10.

The main body member 4d has the first space A1, the second space A2, the third space A3, and the crankshaft hole that are formed in the foregoing manner. The main body member 4d has a first side portion 4f located on one side in the axial direction of the second space A2 (on a upper surface S1 side illustrated in FIG. 1), a second side portion 4g located on another side in the axial direction of the second space A2 (on a bottom surface S2 side illustrated in FIG. 1), and a connection portion 4k that connects the first side portion 4f and the second side portion 4g. The third space A3 that radially extends is formed in a part of the connection portion 4k.

The protrusion member 4e is formed on the side surface of the main body member 4d. Specifically, the protrusion member 4e has a fourth space A4. The fourth space A4 is a space through which the protrusion member 4e extends in a direction perpendicular to the axial direction of the axial conversion gear device X1. The fourth space A4 encloses the input shaft 20. The fourth space A4 is connected to the third space A3 that opens on the side surface of the main body member 4d.

The end plate member 4b and pedestal 4a support the crankshaft 10 on both sides of the oscillation gears 14 and 16. The end plate member 4b faces the pedestal 4a through the oscillation gears 14 and 16 in the axial direction of the axial conversion gear device X1. Formed in the end plate member 4b are a through-hole into which the cylindrical member 5 is inserted and the crankshaft hole that encloses an end portion of the crankshaft 10 opposite to the shaft gear 10d.

The shaft member 4c extends in the axial direction of the pedestal 4a and the end plate member 4b and connects the pedestal 4a and the end plate member 4b. Specifically, the shaft members 4c are located between the pedestal 4a and the end plate member 4b and are inserted into insertion holes 14c and 16c of the oscillation gears 14 and 16. One end of each of the shaft members 4c is connected to the pedestal 4a. The other end of each of the shaft members 4c is secured to the end plate member 4b with the bolt B2. The shaft members 4c are located in the circumferential direction of the carrier 4 such that the shaft members 4c are spaced apart at a predetermined distance from the center axis C1. According to the present embodiment, six shaft members 4c are disposed. Alternatively, the number of shaft members 4c may be changed depending on the use of the axial conversion gear device X1.

The crankshafts 10 are disposed equally in the circumferential direction of the carrier 4 so that the crankshafts 10 are spaced apart at a predetermined distance from the center axis C1. The crankshafts 10 are inserted into the insertion holes 14b and 16b of the oscillation gears 14 and 16 and also enclosed in the crankshaft holes of the pedestal 4a and the end plate member 4b. A pair of crankshaft bearings 12a and 12b that are axially spaced apart from each other are disposed between each of the crankshafts 10 and the carrier 4. The crankshaft bearings 12a and 12b allow the crankshafts 10 to rotate relative to the carrier 4. According to the present embodiment, three crankshafts 10 are disposed. Alternatively, the number of crankshafts 10 may be changed depending on the use of the axial conversion gear device X1.

Each of the crankshafts 10 has a shaft main body 10c, a first eccentric portion 10a, a second eccentric portion 10b, and a shaft gear 10d.

The shaft main body 10c is a member that composes an axis of the crankshaft 10 and extends along the center axis C1 of the axial conversion gear device X1.

The first eccentric portion 10a and the second eccentric portion 10b each have a cylindrical shape and are integrally formed with the shaft main body 10c so that the first eccentric portion 10a and the second eccentric portion 10b are eccentric to the axis of the shaft main body 10c by a predetermined eccentric amount. The first eccentric portion 10a and the second eccentric portion 10b are eccentric to the axis of the shaft main body 10c by predetermined eccentric amounts. The first eccentric portion 10a and the second eccentric portion 10b are located so that they have a phase difference of predetermined angles.

The shaft gear 10d is attached to an end portion on the bottom surface S2 side in the axial direction of the shaft main body 10c. As the shaft gear 10d rotates, the entire crankshaft 10 rotates.

The oscillation gears 14 and 16 are disposed in the second member 2B of the outer cylinder 2 and between the pedestal 4a and the end plate member 4b. An outer diameter of each of the oscillation gears 14 and 16 is slightly smaller than an inner diameter of the second member 2B of the outer cylinder 2. The oscillation gears 14 and 16 have through-holes that extend in the axial direction of the axial conversion gear device X1. The cylindrical member 5 is inserted into the through-holes.

The first oscillation gear 14 has a first outer tooth member 14a, a plurality of insertion holes 14b, and a plurality of insertion holes 14c. The first outer tooth member 14a is a member having successive teeth smoothly formed on the entire perimeter of the first oscillation gear 14. A number of teeth of the first outer tooth member 14a is smaller than a number of inner tooth pins 3. The insertion holes 14b are members into which the eccentric portions 10a are inserted. In the insertion holes 14b, the first oscillation gear 14 is attached to the first eccentric portions 10a through a plurality of first roller bearings. The insertion holes 14c are members into which the shaft members 4c are inserted. An outer diameter of each of the insertion holes 14c is slightly greater than an outer diameter of each of the shaft members 4c.

When the first eccentric portion 10a eccentrically rotates as the crankshaft 10 rotates, the first oscillation gear 14 oscillates and rotates while the first outer tooth member 14a is engaged with the inner tooth pins 3.

The second oscillation gear 16 is located closer to the pedestal 4a side than the first oscillation gear 14. The second oscillation gear 16 has the same structure as the first oscillation gear 14. Specifically, the second oscillation gear 16 has a second outer tooth member 16a, a plurality of insertion holes 16b, and a plurality of insertion holes 16c. In the insertion holes 16b, the second oscillation gear 16 is attached to the second eccentric portions 10b through a plurality of second roller bearings.

When the second eccentric portion 10b eccentrically rotates as the crankshaft 10 rotates, the second oscillation gear 16 oscillates and rotates while the second outer tooth member 16a is engaged with the inner tooth pins 3.

According to the present embodiment, the first oscillation gear 14 and the second oscillation gear 16 that differ in phases are used. Alternatively, one oscillation gear or three or more oscillation gears may be used.

The cylindrical member 5 is disposed to pass through the outer cylinder 2, the carrier 4, and the oscillation gears 14 and 16 in the axial direction of the axial conversion gear device X1. Specifically, the cylindrical member 5 is inserted into through-holes formed at center portions of the first member 2A of the outer cylinder 2, the end plate member 4b of the carrier 4, and the oscillation gears 14 and 16. In addition. A part of the cylindrical member 5 is enclosed in the first space A1 of the pedestal 4a of the carrier 4. As a result, the cylindrical member 5 is located so that the center axis of the cylindrical member 5 overlaps with the center axis C1 of the axial conversion gear device X1. For example, a cable and so forth (not shown) are inserted into the cylindrical member 5.

The transmitting gear 6 is a gear that transfers torque that is input from the input shaft 20 (that will be described later) to the axial conversion unit 8 to the crankshafts 10. The transmitting gear 6 circumferentially surrounds the cylindrical member 5. The transmitting gear 6 is enclosed in the second space A2 of the main body member 4d of the pedestal 4a.

The transmitting gear 6 has a first gear 6a, a second gear 6b, a first extension member 6c, a second extension member 6d, a connection member Ge, and a protrusion member 6f.

The first gear 6a is a gear that rotates around the center axis C1. The first gear 6a is engaged with the shaft gear 10d of each of the crankshafts 10.

Like the first gear 6a, the second gear 6b is a gear that rotates around the center axis C1. The second gear 6b is spaced apart from the first gear 6a in the axial direction of the axial conversion gear device X1. The second gear 6b is located closer to the bottom surface S2 side than the first gear 6a. In other words, the first gear 6a is located farther from the bottom surface S2 than the second gear 6b in the axial direction of the axial conversion gear device X1. According to the present embodiment, an outer diameter of the second gear 6b is greater than an outer diameter of the first gear 6a.

Figure 3:
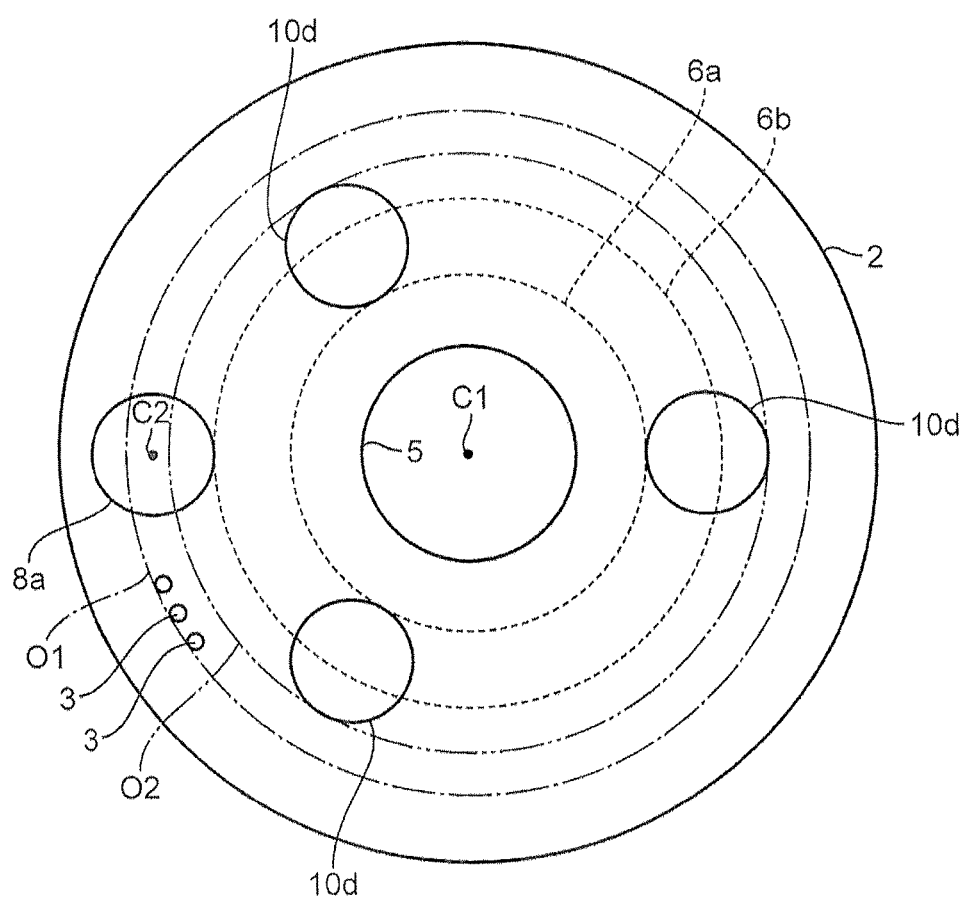
FIG. 3 is a schematic diagram illustrating a relationship of outer perimeters of individual members of the axial conversion gear device according to the present embodiment.
Figure 4:
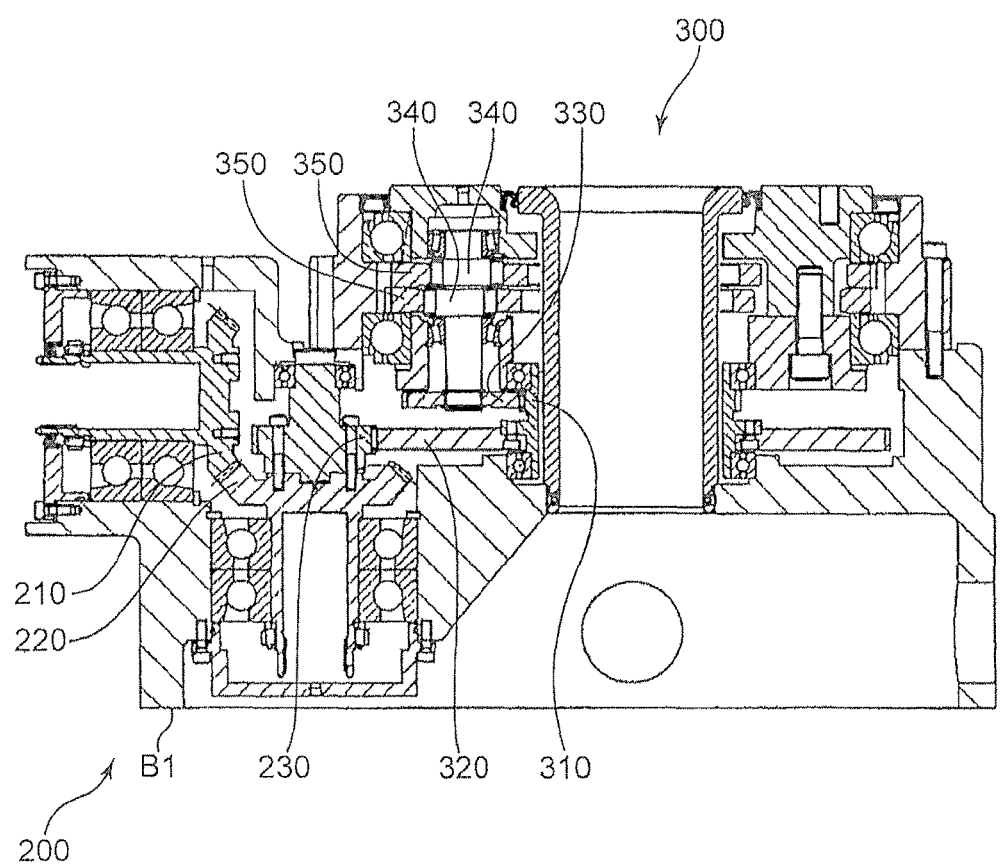
FIG. 4 is a sectional view illustrating an outlined structure of a gear transfer device described in Japanese Unexamined Patent Publication No. 2010-101366.
Figure 5:
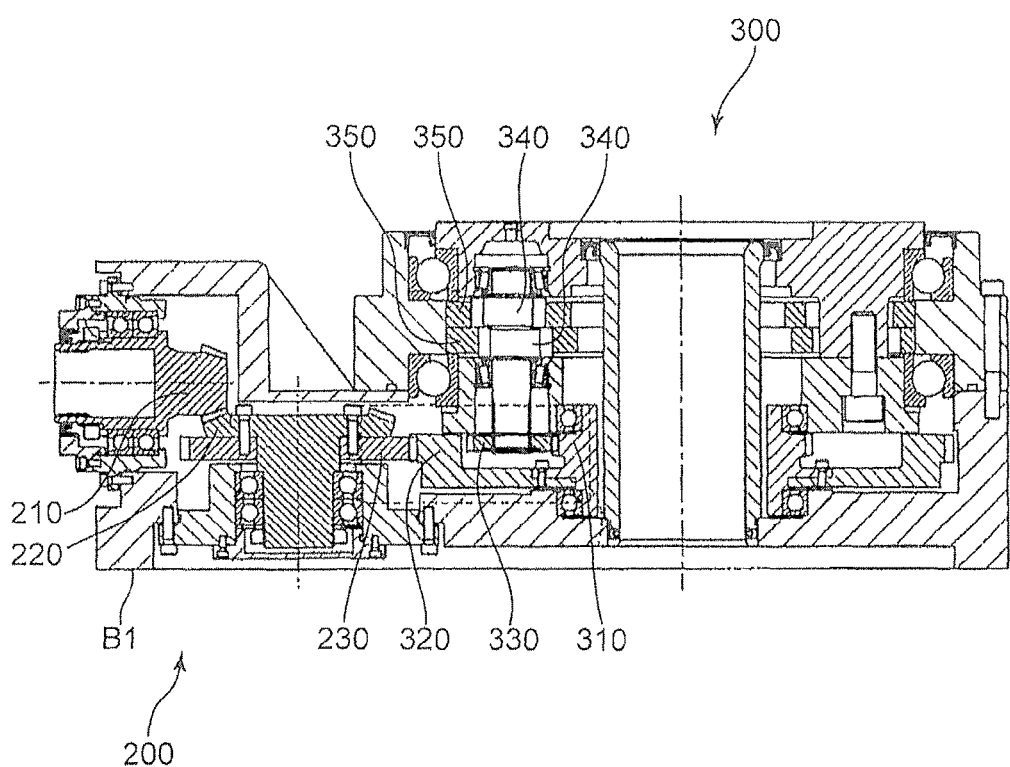
FIG. 5 is a sectional view illustrating an outlined structure of a gear transfer device described in Japanese Unexamined Patent Publication No. 2010-159851.

FIG. 3 is an axial view of the axial conversion gear device X1 where outer perimeters of the outer cylinder 2, the cylindrical member 5, the shaft gears 10d, and the external tooth gear 8a are schematically represented by solid lines and outer perimeters of the first gear 6a and the second gear 6b are schematically represented by dotted lines. Moreover, in FIG. 3, a shaft gear contact circle O2 having a radius ranging from the center axis C1 to the outermost perimeter of the shaft gears 10d is represented by a two-dot chain line. In the present specification, the outermost perimeter of the shaft gears 10d represents an outer perimeter located farthest from the center axis C1 of those of the shaft gears 10d.

As illustrated in FIG. 3, an outer diameter of the second gear 6b is smaller than a diameter of the shaft gear contact circle O2. In other words, a clearance from the center axis C1 to the outermost perimeter of the second gear 6b is smaller than a clearance from the center axis C1 to the outermost perimeter of the shaft gears 10d.

The first extension member 6c is a tubular member that extends from an inner circumferential portion of the first gear 6a to the second gear 6b side (on a lower side illustrated in FIG. 1) in the axial direction of the axial conversion gear device X1.

The second extension member 6d is a tubular member that extends from an inner circumferential portion of the second gear 6b to the first gear 6a side (on an upper side illustrated in FIG. 1) in the axial direction of the axial conversion gear device X1. An outer diameter of the second extension member 6d is greater than an outer diameter of the first extension member 6c.

The connection member 6e is a member that connects an end portion opposite to the first gear 6a of the first extension member 6c to an end portion opposite to the second gear 6b of the second extension member 6d. The connection member 6e extends in radial directions of the first gear 6a and the second gear 6b.

The protrusion member 6f is a member that protrudes from the inner circumferential portion of the first gear 6a on the opposite side of the second gear 6b (on the upper side illustrated in FIG. 1) in the axial direction of the axial conversion gear device X1.

According to the present embodiment, the first gear 6a, the first extension member 6c, the connection member 6e, and the protrusion member 6f are integrally formed. In addition, the second gear 6b and the second extension member 6d are integrally formed. The connection member 6e and the second extension member 6d are secured with a plurality of bolts B3 so as to compose the transmitting gear 6.

Disposed between the transmitting gear 6 and the carrier 4 are a pair of bearings 7a and 7b that are spaced apart from each other in the axial direction of the transmitting gear 6. The bearings 7a and 7b allow the transmitting gear 6 to rotate relative to the carrier 4 around the center axis C1.

The bearing 7a is mounted on a mounting surface of the first side portion 4f in the axial direction of the main body member 4d. The mounting surface is a surface that faces the protrusion member 6f in a direction perpendicular to the center axis C1 of the first side portion 4f. As a result, the bearing 7a is located between the mounting surface of the first side portion 4f and the protrusion member 6f of the transmitting gear 6.

The bearing 7b is mounted on a mounting member 4h formed on the second side portion 4g in the axial direction of the main body member 4d. The mounting member 4h is a member that axially extends to a space formed between the cylindrical member 5 and the second extension member 6d of the transmitting gear 6 in the second side portion 4g. As a result, the bearing 7b is located between the mounting member 4h of the second side portion 4g and the second extension member 6d of the transmitting gear 6.

Thus, according to the present embodiment, the bearing 7a is located outside in the radial direction of the transmitting gear 6. In addition, the bearing 7b is located inside in the radial direction of the transmitting gear 6. These bearings 7a and 7b rotatably support the transmitting gear 6.

The axial conversion unit 8 is a gear unit that converts torque that is input from the input shaft 20 (that will be described later) into torque in the axial direction of the axial conversion gear device X1. The axial conversion unit 8 is enclosed in the third space A3 of the main body member 4d of the pedestal 4a.

Bearings 9a and 9b are disposed between the axial conversion unit 8 and the carrier 4. Specifically, the first side portion 4f on one side (on the upper surface S1 side illustrated in FIG. 1) in the axial direction of the third space A3 of the main body member 4d has a mounting member 4i to which the bearing 9a is mounted. The second side portion 4g on the other side (on the bottom surface S2 side illustrated in FIG. 1) in the axial direction of the third space A3 of the main body member 4d has a mounting member 4j to which the bearing 9b is mounted. The bearings 9a and 9b mounted to the mounting members 4i and 4j allow the axial conversion unit 8 to rotate relative to the carrier 4 around the center axis C2. The center axis C2 is an axis that extends in parallel with the center axis C1 of the transmitting gear 6.

Figure 2:
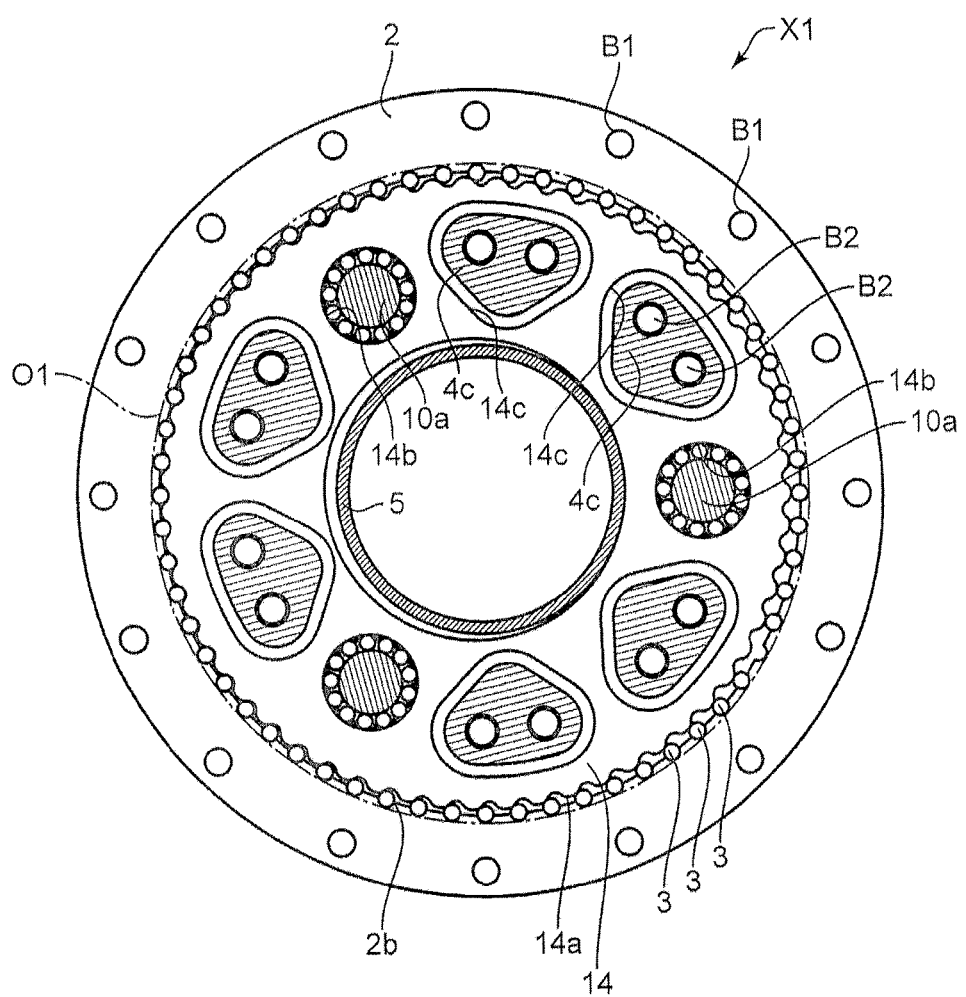
FIG. 2 is a sectional view taken along line II-II illustrated in FIG. 1.

In FIG. 3, an inner tooth contact circle O1 having a radius ranging from the center axis C1 illustrated in FIG. 2 to the outermost perimeter of the inner tooth pins 3 is represented by a one-dot chain line. In the present specification, the outermost perimeter of the inner tooth pins 3 represents an outer perimeter located farthest from the center axis C1 of outer perimeters of the inner tooth pins 3.

As illustrated in FIG. 3, the center axis C2 of the axial conversion unit 8 is located inside the inner tooth contact circle O1. In other words, a clearance from the center axis C1 to the center axis C2 is smaller than a clearance from the center axis C1 to an outermost perimeter of the inner tooth pins 3.

The axial conversion unit 8 has the external tooth gear 8a and an axial conversion gear 8b.

The external tooth gear 8a is located closer to the bottom surface S2 side than the axial conversion gear 8b in the axial direction of the axial conversion gear device X1. An outer diameter of the external tooth gear 8a is smaller than an outer diameter of the axial conversion gear 8b. The external tooth gear 8a is engaged with the second gear 6b of the transmitting gear 6 in the radial direction of the external tooth gear 8a.

The axial conversion gear 8b is located closer to the first gear 6a side than the external tooth gear 8a in the axial direction of the axial conversion gear device X1. According to the present embodiment, the axial conversion gear 8b is composed of a bevel gear. The outer diameter of the axial conversion gear 8b is greater than the outer diameter of the external tooth gear 8a. The axial conversion gear 8h is located between the first gear 6a and the second gear 6b in the axial direction of the axial conversion gear device X1. In addition, an outer perimeter portion 8c of the axial conversion gear 8b has a portion that overlaps with the second gear 6b in the axial direction of the axial conversion gear device X1.

The input shaft 20 is, for example, a member to which torque is input from an external motor. The input shaft 20 is enclosed in the fourth space A4 formed in the protrusion member 4e of the pedestal 4a. The input shaft 20 extends in a direction perpendicular to the axial direction of the axial conversion gear device X1. A pair of bearings 22a and 22b that are spaced apart from each other in the axial direction of the input shaft 20 are disposed between the input shaft 20 and the protrusion member 4e. The bearings 22a and 22b allow the input shaft 20 to rotate relative to the carrier 4 around a center axis C3.

The input shaft 20 has an input gear 20a and an input hole 20b.

The input gear 20a is disposed at an end portion of the input shaft 20. According to the present embodiment, the input gear 20a is composed of a bevel gear. The input gear 20a is engaged with the axial conversion gear 8b of the axial conversion unit 8 through the third space A3 that is open on a side surface of the main body member 4d of the pedestal 4a.

The input hole 20b is, for example, a hole into which an output shaft of an external motor is inserted. Torque of the output shaft of the external motor is input to the input shaft 20 through the input hole 20b in the direction perpendicular to the axial direction of the axial conversion gear device X1. As a result, the input shaft 20 rotates around the center axis C3.

In the axial conversion gear device X1 having the foregoing structure, for example, input torque of an external motor causes the input shaft 20 to rotate around the center axis C3. As a result, since the axial conversion gear 8b engaged with the input gear 20a rotates, the external tooth gear 8a rotates around the center axis C2. Thus, the input torque around the center axis C3 is converted into torque around the center axis C2. The transmitting gear 6 having the second gear 6b engaged with the external tooth gear 8a rotates around the center axis C1. As a result, the shaft gears 10d engaged with the first gear 6a rotate. As the shaft gears 10d rotate, the eccentric portions 10a and 10b eccentrically rotate and the oscillation gears 14 and 16 oscillate and rotate. The first oscillation gear 14 and the second oscillation gear 16 engaged with the inner tooth pins 3 rotate while their engagement points are moving. As a result, the outer cylinder 2 and the carrier 4 relatively rotate around the center axis C1.

As described above, in the axial conversion gear device X1, the axial conversion gear 8b is located closer to the first gear 6a side than the external tooth gear 8a in the axial direction of the axial conversion gear device X1. Thus, the external tooth gear 8a can be located in the dead space formed between the axial conversion gear 8b and the bottom surface S2 in the axial direction of the axial conversion gear device X1. As a result, since the dead space can be effectively used, the axial conversion gear device X1 can be prevented from axially becoming large. In addition, the axial conversion gear 8b is disposed between the first gear 6a and the second gear 6b in the axial direction of the axial conversion gear device X1. Thus, the axial conversion gear 8b does not radially interfere with the first gear 6a and the shaft gears 10d engaged with the first gear 6a. As a result, the center axis C1 of the transmitting gear 6 can be located close to the center axis C2 of the axial conversion unit 8 in the radial direction of the axial conversion gear device X1. Consequently, the axial conversion gear device X1 can be radially downsized.

Moreover, in the axial conversion gear device X1, the outer diameter of the external tooth gear 8a is smaller than the outer diameter of the axial conversion gear 8b. In the axial conversion unit 8, the outer perimeter portion 8c of the axial conversion gear 8b overlaps with the second gear 6b in the axial direction of the axial conversion gear device X1. As a result, since the center axis C1 of the transmitting gear 6 is located close to the center axis C2 of the axial conversion unit 8 in the radial direction of the axial conversion gear device X1, the axial conversion gear device X1 can be radially downsized.

In the axial conversion gear device X1, the outer diameter of the second gear 6b is smaller than the outer diameter of the shaft gear contact circle O2. Thus, the axial conversion unit 8 having the external tooth gear 8a engaged with the second gear 6b can be located close to the center axis C1 of the transmitting gear 6. As a result, the axial conversion gear device X1 can be radially downsized.

In the axial conversion gear device X1, the center axis C2 of the axial conversion unit 8 is located inside the inner tooth contact circle O1. Thus, the main body member 4d of the carrier 4 that supports the axial conversion unit 8 can be prevented from radially becoming large.

It should be understood by those skilled in the art that the present embodiment is an example, not limited. The scope of the present invention is represented by the scope of the appended claims rather than the description of the foregoing embodiment. In addition, various modifications, combinations, sub-combinations and alternations may occur within the scope of the appended claims or the equivalents thereof.

For example, in the axial conversion gear device X1 according to the present embodiment, the center axis C3 of the input shaft 20 intersects with the center axis C2 of the axial conversion unit 8. Thus, input torque is orthogonally converted. Alternatively, the axial conversion unit 8 may convert torque that is input from a direction different from the axial direction of the axial conversion unit 8 to the axial direction.

In the axial conversion gear device X1 according to the present embodiment, the input gear 20a and the axial conversion gear 8b are bevel gears. Alternatively, the input gear 20a and the axial conversion gear 8b may not be bevel gears as long as the axial conversion unit 8 can convert an axial direction of input torque to another axial direction.

In the axial conversion gear device X1 according to the present embodiment, a plurality of crankshafts 10 is disposed and one transmitting gear 6 is engaged with a plurality of shaft gears 10d. Alternatively, one crankshaft 10 may be disposed. In this case, one transmitting gear 6 is engaged with one shaft gear 10d.

In the axial conversion gear device X1 according to the present embodiment, the transmitting gear 6 is a cavity member and the cylindrical member 5 is inserted into the cavity portion of the transmitting gear 6. Alternatively, when the cylindrical member 5 is not provided, the transmitting gear 6 may be a non-cavity member.

In the axial conversion gear device X1 according to the present embodiment, the outer cylinder 2 is a rotation side member of the axial conversion gear device X1, whereas the carrier 4 is a fixed side member of the axial conversion gear device X1. Alternatively, the outer cylinder 2 may be a fixed side member of the axial conversion gear device X1, whereas the carrier 4 may be a rotation side member of the axial conversion gear device X1. In this case, the first member 2A of the outer cylinder 2 composes the bottom surface S2 of the axial conversion gear device X1, whereas the pedestal 4a of the carrier 4 composes the upper surface S1 of the axial conversion gear device X1.

Note that the specific embodiment described above includes an invention having the following configurations.

Specifically, the axial conversion gear device according to the present invention is a axial conversion gear device having the following configurations: a crankshaft having a shaft main body, an eccentric portion that is eccentric to the shaft main body, and a shaft gear disposed on the shaft main body; an oscillation gear having a plurality of external teeth and oscillating and rotating due to rotation of the eccentric portion; a transmitting gear having a first gear engaged with the shaft gear of the crankshaft and a second gear spaced apart from the first gear in an axial direction of the first gear; an axial conversion unit having an external tooth gear engaged with the second gear and an axial conversion gear converting input torque into torque in an axial direction of the external tooth gear; and an outer cylinder having a plurality of internal teeth engaged with the external teeth of the oscillation gear respectively, wherein in the axial direction of the external tooth gear, the axial conversion gear is located between the first gear and the second gear.

In the foregoing axial conversion gear device, the axial conversion gear is located axially closer to the first gear side than the external tooth gear. Thus, the external tooth gear of the axial conversion unit is located in the area corresponding to the dead space that occurs in the gear transfer device described in Japanese Unexamined Patent Publication No. 2010-101366. As a result, the axial conversion gear device can be prevented from axially becoming large. In addition, in the axial conversion gear device, the axial conversion gear is located between the first gear and the second gear in the axial direction of the external tooth gear. Thus, the axial conversion gear does not interfere with the first gear and the axial gear engaged with the first gear in the radial direction of the external tooth gear. As a result, the center axis of the transmitting gear can be located close to the center axis of the axial conversion unit in the radial direction of the external tooth gear. Consequently, the axial conversion gear device can be radially downsized.

An outer diameter of the external tooth gear is desirably smaller than an outer diameter of the axial conversion gear. In the axial conversion unit, a part of an outer perimeter portion of the axial conversion gear desirably overlaps with the second gear in the axial direction of the external tooth gear.

In the foregoing axial conversion gear device, the axial conversion gear is located between the first gear and the second gear in the axial direction of the external tooth gear. Since the outer diameter of the external tooth gear is smaller than the outer diameter of the axial conversion gear, the outer circumferential portion of the axial conversion gear and the second gear can be located so that the outer circumferential portion and the second gear overlap with each other. As a result, the clearance between the center axis of the transmitting gear and the center axis of the axial conversion gear becomes small. Consequently, the axial conversion gear device can be radially downsized.

An outer diameter of the second gear is desirably smaller than a diameter of a shaft gear contact circle having a radius ranging from a center axis of the transmitting gear to an outermost perimeter of the shaft gear.

In the foregoing axial conversion gear device, the outer diameter of the second gear is smaller than the diameter of the shaft gear contact circle. Thus, since the outer diameter of the second gear can be decreased, the axial conversion unit having the external tooth gear engaged with the second gear can be located closer to the center axis of the transmitting gear. Consequently, the axial conversion gear device can be radially downsized.

The axial conversion gear device desirably further includes a carrier rotatably supporting the crankshaft, the transmitting gear, and the axial conversion unit and rotating relative to the outer cylinder around the center axis of the transmitting gear due to oscillation and rotation of the oscillation gear. A center axis of the axial conversion unit is desirably located inside an inner tooth contact circle having a radius ranging from the center axis of the transmitting gear to an outermost perimeter of the internal teeth.

In the foregoing axial conversion gear device, since the clearance between the center axis of the transmitting gear and the center axis of the axial conversion unit becomes small, the center axis of the axial conversion unit can be located inside the inner tooth contact circle. Consequently, the carrier that supports the axial conversion unit can be prevented from radially becoming large.

The axial conversion gear device desirably further includes a carrier rotatably supporting the crankshaft, the transmitting gear, and the axial conversion unit and rotating relative to the outer cylinder around the center axis of the transmitting gear due to the oscillation and rotation of the oscillation gear, wherein an outer diameter of the second gear is smaller than a diameter of a shaft gear contact circle having a radius ranging from a center axis of the transmitting gear to an outermost perimeter of the shaft gear, and a center axis of the axial conversion unit is located inside an inner tooth contact circle having a radius ranging from the center axis of the transmitting gear to an outermost perimeter of the internal teeth.

The axial conversion gear desirably includes a bevel gear.

This application is based on Japanese Patent application No. 2014-097887 filed in Japan Patent Office on May 9, 2014, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An axial conversion gear device comprising:
   a crankshaft having a shaft main body, an eccentric portion that is eccentric to the shaft main body, and a shaft gear disposed on the shaft main body;
   an oscillation gear having a plurality of external teeth and oscillating and rotating due to rotation of the eccentric portion;
   a transmitting gear having a first gear engaged with the shaft gear of the crankshaft and a second gear spaced apart from the first gear in an axial direction of the first gear;
   an axial conversion unit having an external tooth gear engaged with the second gear and an axial conversion gear converting input torque into torque in an axial direction of the external tooth gear; and
   an outer cylinder having a plurality of internal teeth engaged with the external teeth of the oscillation gear respectively, wherein
   in the axial direction of the external tooth gear, the axial conversion gear is located between the first gear and the second gear.

2. The axial conversion gear device according to claim 1, wherein
   an outer diameter of the external tooth gear is smaller than an outer diameter of the axial conversion gear, and
   in the axial conversion unit, a part of an outer perimeter portion of the axial conversion gear overlaps with the second gear in the axial direction of the external tooth gear.

3. The axial conversion gear device according to claim 1, wherein an outer diameter of the second gear is smaller than a diameter of a shaft gear contact circle having a radius ranging from a center axis of the transmitting gear to an outermost perimeter of the shaft gear.

4. The axial conversion gear device according to claim 1, further comprising:
   a carrier rotatably supporting the crankshaft, the transmitting gear, and the axial conversion unit and rotating relative to the outer cylinder around the center axis of the transmitting gear due to the oscillation and rotation of the oscillation gear, wherein
   a center axis of the axial conversion unit is located inside an inner tooth contact circle having a radius ranging from the center axis of the transmitting gear to an outermost perimeter of the internal teeth.

5. The axial conversion gear device according to claim 1, further comprising:
   a carrier rotatably supporting the crankshaft, the transmitting gear, and the axial conversion unit and rotating relative to the outer cylinder around the center axis of the transmitting gear due to the oscillation and rotation of the oscillation gear, wherein
   an outer diameter of the second gear is smaller than a diameter of a shaft gear contact circle having a radius ranging from a center axis of the transmitting gear to an outermost perimeter of the shaft gear, and
   a center axis of the axial conversion unit is located inside an inner tooth contact circle having a radius ranging from the center axis of the transmitting gear to an outermost perimeter of the internal teeth.

6. The axial conversion gear device according to claim 1, wherein
   the axial conversion gear includes a bevel gear.

* * * * *